US 6,666,590 B2

(12) United States Patent
Brosnan

(10) Patent No.: US 6,666,590 B2
(45) Date of Patent: Dec. 23, 2003

(54) HIGH BRIGHTNESS LASER DIODE COUPLING TO MULTIMODE OPTICAL FIBERS

(75) Inventor: Stephen J. Brosnan, San Pedro, CA (US)

(73) Assignee: Northrop Grumman Corporation, Redondo Beach, CA (US)

(*) Notice: Subject to any disclaimer, the term of this patent is extended or adjusted under 35 U.S.C. 154(b) by 219 days.

(21) Appl. No.: 09/738,520

(22) Filed: Dec. 14, 2000

(65) Prior Publication Data

US 2003/0118291 A1 Jun. 26, 2003

(51) Int. Cl.[7] ............................. G02B 6/36; G02B 27/10
(52) U.S. Cl. ......................... 385/93; 385/33; 385/35; 372/75; 359/623; 359/628
(58) Field of Search ........................ 385/89, 92, 93, 385/36, 35, 33; 372/75, 71, 101, 102; 359/623, 626, 710, 618, 622

(56) References Cited

U.S. PATENT DOCUMENTS

| 4,763,975 A | 8/1988 | Scifres et al. |
| 4,785,459 A | 11/1988 | Baer |
| 4,818,062 A | 4/1989 | Scifres et al. |
| 4,837,771 A | 6/1989 | Baer |
| 4,894,839 A | 1/1990 | Baer |
| 4,908,832 A | 3/1990 | Baer |
| RE33,722 E | 10/1991 | Scifres et al. |
| 5,127,068 A | 6/1992 | Baer et al. |
| 5,139,609 A | 8/1992 | Fields et al. |
| 5,268,978 A | 12/1993 | Po et al. |
| 5,297,068 A | 3/1994 | Guilfoyle et al. |
| 5,298,735 A | 3/1994 | Peterson et al. |
| 5,369,661 A * | 11/1994 | Yamaguchi et al. ........... 372/69 |
| 5,394,426 A | 2/1995 | Joslin |
| 5,432,722 A | 7/1995 | Guilfoyle et al |
| 5,436,990 A | 7/1995 | Head et al. |
| 5,455,838 A | 10/1995 | Heritier et al. |
| 5,469,286 A | 11/1995 | Nicole . |
| 5,485,482 A | 1/1996 | Selker et al. |
| 5,513,201 A * | 4/1996 | Yamaguchi et al. ........... 372/75 |
| 5,557,475 A | 9/1996 | Nightingale et al. |
| 5,568,577 A | 10/1996 | Hardy, Jr. et al. |
| 5,579,422 A | 11/1996 | Head et al. |
| 5,580,471 A | 12/1996 | Fukumoto et al. |
| 5,617,492 A | 4/1997 | Beach et al. |
| 5,627,850 A | 5/1997 | Irwin et al. |
| 5,629,997 A | 5/1997 | Hardy, Jr. |
| 5,636,069 A | 6/1997 | Nightingale et al. |
| 5,689,522 A | 11/1997 | Beach |
| 5,734,672 A | 3/1998 | McMinn et al. |
| 5,734,766 A | 3/1998 | Flint |
| 5,745,519 A | 4/1998 | Ruda et al. |
| 5,768,453 A | 6/1998 | Gardner |
| 5,790,576 A * | 8/1998 | Waarts et al. .................. 372/43 |
| 5,798,877 A | 8/1998 | Nightingale et al. |
| 5,805,748 A | 9/1998 | Izawa |
| 5,832,150 A | 11/1998 | Flint |
| 5,862,278 A * | 1/1999 | Brauch et al. .................. 385/34 |
| 5,877,898 A | 3/1999 | Hollemann et al. |
| 5,911,022 A | 6/1999 | Plickert et al. |
| 6,151,168 A * | 11/2000 | Goering et al. ............. 359/623 |
| 6,215,598 B1 * | 4/2001 | Hwu ........................... 359/641 |

* cited by examiner

Primary Examiner—Hemang Sanghavi
(74) Attorney, Agent, or Firm—Katten Muchin Zavis Rosenman

(57) ABSTRACT

A system for coupling light emitted from a plurality of laser diodes to a single optical fiber provides increased pump light brightness to the optical fiber to provide increased power fiber amplifiers. The system takes advantage of the brightness mismatch in the fast and slow planes of a laser diode to allow capture of more than one diode's power into a single multimode pump fiber. A first cylindrical lens is disposed to collimate light from the fast planes of the diodes. A second cylindrical lens is disposed orthogonal to the optical axis and perpendicular to the first cylindrical lens and images light from the diodes in the slow plane. A collection lens is provided to image the light from the slow plane as well as collect light from the fast plane and directs light from multiple diodes into a single multimode optical fiber.

10 Claims, 2 Drawing Sheets

HIGH BRIGHTNESS LASER DIODE COUPLING TO MULTIMODE OPTICAL FIBERS

BACKGROUND OF THE INVENTION

1. Field of the Invention

The present invention relates to a coupling system for coupling a plurality of laser diodes to a single optical fiber, which provides increased pump light brightness to optical fiber amplifier in order to provide fiber amplifiers with increased power.

2. Description of the Prior Art

Various fiber optical amplifiers are known. Such fiber optic amplifiers normally include an optical fiber and a source of pump light, which excites the active material in the fiber core to a relatively high-energy metastable state. Various techniques are known for coupling the pump light, for example, from a laser diode, to an optical fiber. These techniques are disclosed in U.S. Pat. Nos. 5,127,066; 5,266,978; 5,436,990; 5,636,069; 5,734,766; and 5,745,519, hereby incorporated by reference. These techniques attempt to compensate for the different numerical apertures associated with different planes of the laser diode. An exemplary diode laser bar stack assembly is illustrated in FIG. 1 and generally identified with the reference number 20. As shown, the assembly 20 includes a plurality of laser diodes, known as stripes, generally indicated by the reference numeral 22. In an XYZ coordinate system, the stripes 22 emit light along an axis parallel to the X axis, perpendicular to the plane of the page as shown in FIG. 1, defining a plurality of optical axes. In the XY plane, the beam divergence (i.e., angle between opposite beam edges) is relatively small relative to the optical axis, for example, ±5 degrees defining a slow plane. However, in the XZ plane, the beam divergence is substantially larger, for example, ±20 degrees relative to the optical axis, defining a fast plane. The problem with coupling such laser diodes to an optical fiber relates to the difference in the beam divergence or numerical aperture in the orthogonal planes of the stripes 22.

The light emitting apertures of such laser diodes or stripes are typically in the range of 1 micron high by 50 to 200 microns wide. The diameter of typical optical fibers is also in the order of microns. As such, coupling the light from the laser diode having a relatively large numerical aperture in the fast plane to an optical fiber having a diameter in the micron range is relatively complicated and requires relatively precise alignment.

Various attempts have been made to optimize the optical coupling between the laser diodes and an optical fiber. Examples of these attempts are disclosed in U.S. Pat. Nos. 5,127,068; 5,268,978; 5,436,990; 5,579,422;5,629,997; 5,636,069; 5,734,766; 5,745,519; and 5,832,150. In particular, U.S. Pat. Nos. 5,127,068; 5,436,990; and 5,579,422 disclose the use of a small diameter multimode optical fiber with a relatively small numerical aperture, used as a microlens, to collimate the output from the laser diode. The microlens is positioned along a longitudinal axis of the diode laser bar assembly, generally perpendicular to the optical axes. The diameter of the microlens is selected to be 20 to 50 percent larger than the aperture of the laser diodes in the slow plane. A plurality of rectangular cross section optical fibers are butt coupled to the microlens. The numerical aperture of the optical fibers is selected to have roughly the same numerical aperture of the laser diode in the slow plane. One of the rectangular cross section optical fibers is aligned with each laser diode in the laser diode bar assembly.

U.S. Pat. Nos. 5,268,978; 5,629,997; 5,636,069; 5,734,766; and 5,832,150 also disclose optical couplers for coupling the light emitted from one laser diode into an optical fiber. Unfortunately, the power of a fiber optic amplifier is limited by the amount of pump light that is injected into the inner cladding of the dual-clad doped fiber media. As such, fiber amplifiers which utilize diode laser bar assemblies are limited in their output power since known coupling methods are limited to coupling the light from a single laser diode and such diode laser bar assemblies to an optical fiber.

U.S. Pat. No. 5,825,551 illustrates another attempt to increase pumping brightness from a diode laser bar assembly. In this embodiment, an optical system is used to reformat the output of the diode laser bar assembly from a horizontal array of horizontal stripes into a vertical column of horizontal stripes. Unfortunately, such a system requires a relatively complicated optical system. Thus, there is a need to provide an optical coupling arrangement that allows for increased light to be pumped from a diode laser bar assembly to an optical fiber to provide increased power fiber amplifiers.

SUMMARY OF THE INVENTION

Briefly, the present invention relates to a coupling system for coupling light emitted from a plurality of laser diodes to a single optical fiber, which provides increased pump light brightness to the optical fiber to provide increased power fiber amplifiers. In particular, the system takes advantage of the brightness mismatch in the fast and slow planes of a laser diode to allow capture of more than one laser diode's power into a single multimode pump fiber. A first cylindrical lens is disposed to be parallel to a row of a laser diodes in a laser diode bar assembly to collimate light from the fast planes of the diodes or stripes. A second cylindrical lens is disposed orthogonal to the optical axis and perpendicular to the first cylindrical lens and is used to image the light from the stripes in the slow plane. A collection lens is provided to image the light from the slow plane as well as collect light from the fast plane and directs light from multiple stripes into a single multimode optical fiber. By increasing a number of stripes that could be coupled to a single optical fiber, the power of the fiber amplifier can be increased.

DESCRIPTION OF THE DRAWINGS

These and other advantages of the present invention will be readily appreciated with reference to the following specification and attached drawings, wherein.

DETAILED DESCRIPTION OF THE INVENTION

In accordance with an important aspect of the invention, light from a plurality of laser diodes or stripes is coupled to a single optical fiber to increase the output power of the fiber amplifier. The invention takes advantage of the difference in numerical apertures of the stripes in the laser diode bar assembly in the fast plane and the slow plane to capture the light of a plurality of stripes and couple them into a single optical fiber. By effectively coupling the light from multiple stripes to a single optical fiber, the output power of a fiber amplifier can be increased substantially.

Figure 1:
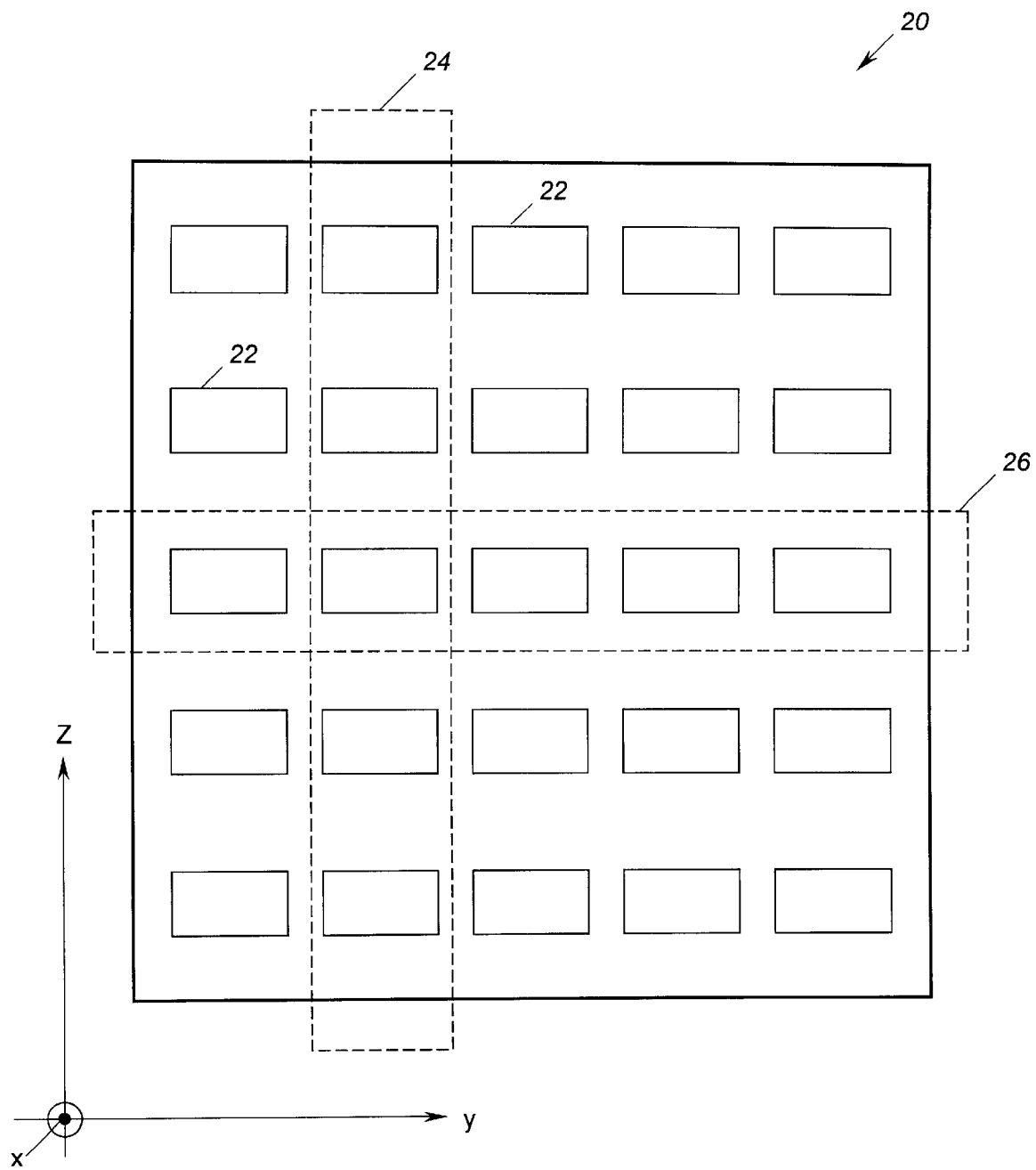
FIG. 1 is a plan view of an exemplary laser diode bar assembly having laser diodes with five rows and five columns of laser diodes or stripes.

As used herein, a stripe is a broad area single emitter of a laser diode. Its dimensions are typically 1 micron high by 50–200 microns wide. The diode emission is single mode in the short dimension ("fast" direction) and multi-mode in the long dimension ("slow" direction). A laser diode bar typically consists of a linear array of such stripes laid out in a row. A laser diode bar stack consists of 2-dimensional array of stripes in which rows of bars are stacked up vertically. The separation between the rows is typically 1–2 millimeters. The limitations in row spacing is set from cooling considerations. An exemplary diode laser bar assembly having a plurality of parallel laser diodes arranged in array is disclosed in U.S. Pat. No. 5,394,426, hereby incorporated by reference generally illustrated in FIG. 1. Referring to FIG. 1, the exemplary laser diode bar assembly 20 is, formed with a plurality of laser diodes or stripes 22. The stripes 22 are arranged in an array, forming a plurality of columns of stripes, shown within the dashed box 24 and a plurality of rows of stripes 22, shown within the dashed box 26.

As will be discussed in more detail below, the present invention enables the light from each column 24 of stripes 22 to be coupled into a single optical fiber in order to increase the brightness of light coupled into the fiber by a factor equal to the number of stripes 22 in the column 24 to provide an increased power fiber amplifier utilizing relatively simple components. In addition, all of the columns 24 can be coupled to a ribbon of multimode fibers, using common optics. Once the pump light is contained within the fibers, the pump light can be routed as needed with great flexibility.

Figure 2:
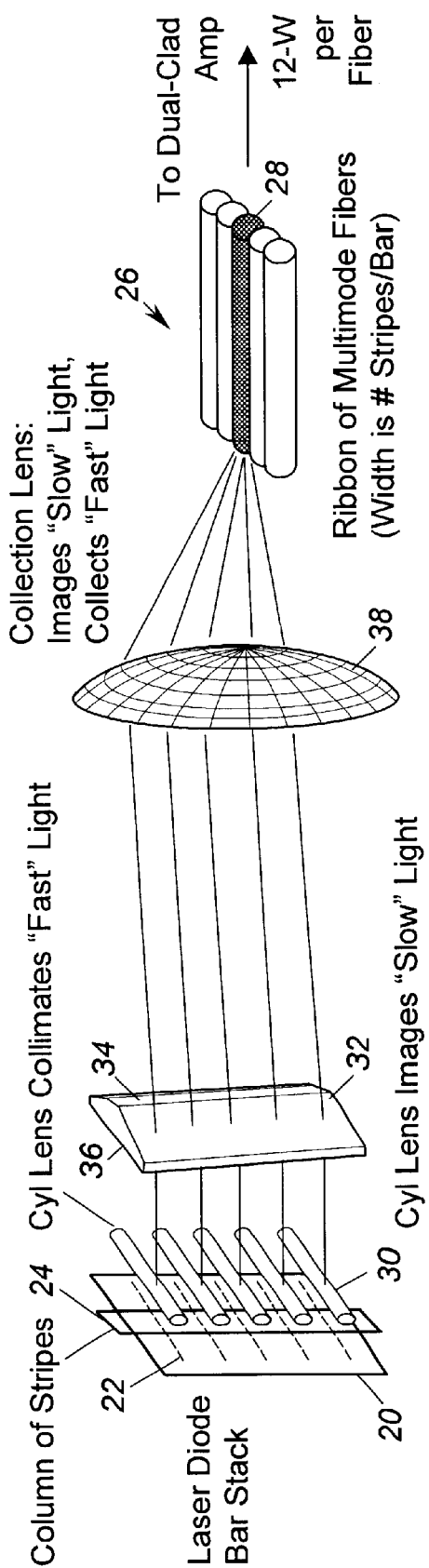
FIG. 2 is an exemplary block diagram of the present invention.

Turning to FIG. 2, the coupling system in accordance with the present invention is illustrated. Only coupling of a single column 24 of stripes 22 is discussed for clarity. However, it is clear that all of the columns 24 of stripes 22 operate in a similar manner to allow the light emitted from all of the stripes 22 in the diode laser bar assembly 22 to be coupled into a ribbon of multimode fibers 26 simultaneously. As mentioned above, each column 24 of stripes 22 is coupled to a single fiber 28 within the ribbon of multimode fibers 26. Thus, as shown in FIG. 2, the five columns 24 of stripes 22 are coupled to the five fibers 28, forming the ribbon of multimode fibers 26.

As mentioned above, the invention takes advantage of the brightness mismatch in the fast and slow planes of the stripes to allow capture of more than one stripe's power into a single multimode pump fiber. In accordance with the invention, a microlens, for example a cylindrical lens 30, may be used to collimate the light from the fast plane of the stripes 22. The cylindrical lens 30 is disposed adjacent to and parallel to each row 26 of stripes 22 perpendicular to the optical axis. Thus, for a diode laser bar assembly 20 having five rows 26 of stripes, five cylindrical lenses 30 are required.

The cylindrical lenses 30 may be formed from a relatively small diameter multimode optical fiber. The diameter of the optical fiber may be selected to be roughly equal to the diameter of the optical fibers 28. The spacing of the cylindrical lenses 30 relative to the stripes 22 is such to provide a nearly collimated beam in the fast direction. Once the distance is ascertained, the cylindrical lenses 30 may be rigidly secured relative to the diode laser bar assembly 20 at the selected distance by way of an adhesive to a support structure at each side of the diode laser beam. Such a configuration enables the cylindrical lenses 30 to collimate light emitted from the stripes 22 from the fast plane.

The cylindrical lens 30 in its most general form is a positive lens. What is shown in the figure is a rod lens. In one embodiment, the lens 30 should have minimized aberrations, the most important of which is spherical aberration. An example of an improved lens with an aspheric surface is a psuedo-aplantic single axis collimator from Blue Sky Research, Product No. M210.

A second cylindrical lens 32 is used to image light from the stripes 22 from the slow plane, while enabling light from the fast plane of the stripes 22 to pass therethrough unaffected. The second cylindrical lens 32 is oriented generally orthogonal to the cylindrical lenses 30 and is disposed to be generally parallel to the columns 24 of stripes 22 in the diode laser bar assembly 20. As shown, the cylindrical lens 32 has a truncated cylindrical cross section, defining an arcuate surface 34 and a generally planar surface 36. The width of the planar surface 36 is selected to be slightly larger than the sum of the width of the diode bar and twice the product of the slow numerical aperture (typically 0.1.) and the lens focal length. In addition, the length of the cylindrical lens 32 is selected to be slightly longer than a column 24 of stripes 22 in the diode laser bar assembly 20.

The cylindrical lens 32 in its most general form is a positive lens. What is shown in the figure is of a plano-convex type. In the preferred embodiment, the lens should be corrected for aberrations, the most important of which is spherical aberration. Examples of lenses that have such properties are:

a doublet or triplet of lenses, which may or may not be cemented together;

a cylindrical lens with one or more aspheric surfaces;

a lens with spherical or flat surfaces that is composed from a material with a varied refractive index, such as the material Gradium, from LightPath, Inc.

The cylindrical lens 32 is positioned with its front focal length at the location of the diode emitters. It is a bulk optic, so it is mounted by any one of a number of techniques familiar to those skilled in the optical art.

As shown in FIG. 2, the cylindrical lens 32 images light from the slow plane of the stripes 22 for each column 24 of stripes 22 in the diode laser bar assembly 20. The collimated fast light from the stripes 22 is virtually unaffected by the imaging lens 32.

The collimated fast light from the fast plane, as well as the imaged slow light from the slow planes of the stripes 22 is collected by a collection lens 38. The collection lens 38 may be generally convex, which images light from the slow planes and collects light from the fast planes in order to channel light from an entire column 24 of stripes 22 into a single multimode fiber 28 as shown.

The collection lens 38 in its most general form is a positive spherical lens. The figure shows this lens to be of a plano-convex type. In one embodiment, the lens 38 should corrected for aberrations, the most important of which is spherical aberration. Examples of lenses that have such properties are:

a doublet or triplet of lenses, which may or may not be cemented together;

a positive lens with one or more aspheric surfaces;

a lens with spherical or flat surfaces that is composed from a material with a varied refractive index, such as the material Gradium, from LightPath, Inc.

The spherical lens 38 is positioned so that its front focal length is at the focal distance of the cylindrical lens 32. This means that the lenses 32 and 38 are separated by the sum of their respective focal lengths. The target multimode optical fiber ribbon is positioned at the focal length of the collection lens 38. The lens placement just specified is well known in optics as that needed to accomplish coherent imaging. This arrangement has a key property that is used by this invention. The central ray of a bundle of "slow" rays is coaxial to the axis of the fiber to which the light is being coupled. Therefore, rays that are emitted by the laser diode at the maximum angle (numeral aperture) do not exceed the numerical aperture of the target fiber.

The lens 38 is a bulk optic, so it is mounted by any one of a number of techniques familiar to those skilled in the optical art.

It has been assumed that the diode stripes in a given column are well positioned directly above and below one another. If this is not true, then the slow axis imaging will not couple all of the power from the off-center stripes efficiently into a single fiber of the ribbon. To deal with this possibility, one embodiment of the invention is to use rectangular fibers as members of the multimode ribbon. These rectangular fibers are positioned side by side with the cores in direct optical contact, so that pump power is collected with increased efficiency. After the power is collected, the individual fibers of the ribbon are separated and routed appropriately.

Assuming that each stripe 22 of the diode laser bar assembly yields three watts, an entire column 24 of stripes 22 will generate 15 watts ideally, or 12 watts realistically, coupled to a single fiber 28. As such, the system in accordance with the present invention is able to couple light from multiple stripes into a single optical fiber without using complicated optical systems as disclosed in the prior art. These optical fibers can then be routed or reformatted in any manner to allow flexible pumping of dual-clad optical amplifiers.

For the laser diode assembly 24 shown with five columns 24 of stripes 22 and each column having five stripes, five multimode fibers configured in a ribbon are required. The number of multimode fibers 28 in the ribbon is selected to correspond to the number of stripes 22 in a row 24.

The coupling device in accordance with the present invention enables light from multiple stripes 22 in a diode laser bar assembly 20 to be coupled to a single optical fiber. Once the light from a column 24 of stripes 22 is directed into a single optical fiber, the fibers may be routed or reformatted in any manner to allow for automated fiber handling and fusing to form fiber amplifiers.

Dual-clad fiber amplifiers into which the pump power is coupled using some number of multimode fibers are the subjects of prior art. The use of a tapered fiber bundle to pump a dual clad amplifier through its end is the subject of a patent by DiGiovanni (U.S. Pat. No. 5,864,644). Another similar technique has been disclosed by IRE Polus (U.S. Pat. No. 5,999,673) in which the individual multimode pump fibers are tapered to a point while being fused to the side of a dual-clad fiber, thereby transferring the respective pump fiber's light into the inner cladding from the side.

For common dual-clad amplifiers such as those disclosed by the prior art the number of pump fibers that can be coupled to the amplifier fiber is limited, so the power of the amplifier is limited therefore by the maximum power that is carried by a single pump fiber. The subject of this invention is a means to greatly increase this power by enabling the power from many stripes to be coupled into one multimode pump fiber.

Obviously, many modification and variations of the present invention are possible in light of the above teachings. For example, thus, it is to be understood that, within the scope of the appended claims, the invention may be practiced otherwise than as specifically described above.

What is claimed and desired to be secured by Letters Patent of the United States is:

1. A coupling device for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns.

2. A coupling device for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns, wherein at least one of said first cylindrical lenses is formed from a multimode optical fiber.

3. A coupling device for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough:

a collection lens for collecting light from said stripes and directing light from a column of stripes into a single optical fiber; and an optical fiber optically aligned with each of said columns, wherein said first cylindrical lenses are configured as a plurality of microlenses and at least one of said plurality of microlenses is selected to have a length substantially equal to the width of a row of stripes in said diode laser bar assembly.

4. A coupling device for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns, wherein said first cylindrical lenses are configured as a plurality of microlenses which are configured to collimate light from a fast plane of the stripes in a column in said diode laser bar assembly.

5. A coupling device for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planers of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripe and directing light from a column of stripes into a single optical fiber; and an optical fiber optically aligned with each of said columns, wherein said second lens is a cylindrical lens.

6. A coupling system for coupling light from a diode laser bar assembly having an array of diode lasers or stripes, arranged in one or more columns and a plurality of rows to an optical fiber, each stripe defining a fast plane and an orthogonal slow plane, the coupling device comprising;

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns, wherein said second lens is formed with a height substantially equal to a column of stripes in said diode laser bar assembly.

7. A coupling system for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns, wherein said collection lens is formed as a convex lens.

8. A coupling system for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns, wherein said collection lens is configured to image light from said slow planes and to collect light from said fast planes.

9. A coupling system for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical lenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns defining a plurality of optical fibers for a plurality of columns, wherein said plurality of optical fibers are configured in a ribbon.

10. A coupling system for coupling light from a diode laser bar assembly having an array of diode lasers or stripes, arranged in one or more columns and a plurality of rows to an optical fiber, each stripe defining a fast plane and an orthogonal slow plane, the coupling device comprising:

one or more first cylindrical tenses for collimating light from said fast planes of said stripes, said first cylindrical lenses disposed generally parallel with said row of stripes in said array;

a second lens for imaging light in each of said columns in said slow planes while enabling light from said fast planes to pass therethrough;

a collection lens for collecting light from said stripes and directing light from a column of stripes into a single optical fiber; and an optical fiber optically aligned with each of said columns defining a plurality of optical fibers for a plurality of columns, said plurality of optical fibers configured in a ribbon, wherein said ribbon is a multimode ribbon with rectangular fibers.

* * * * *